US008235298B2

(12) United States Patent
Berson (10) Patent No.: US 8,235,298 B2
(45) Date of Patent: Aug. 7, 2012

(54) SYSTEMS AND METHODS FOR READING INDICIUM

(76) Inventor: William Berson, Weston, CT (US)

( * ) Notice: Subject to any disclaimer, the term of this patent is extended or adjusted under 35 U.S.C. 154(b) by 0 days.

(21) Appl. No.: 12/643,683

(22) Filed: Dec. 21, 2009

(65) Prior Publication Data

US 2010/0108767 A1 May 6, 2010

Related U.S. Application Data

(63) Continuation of application No. 10/973,926, filed on Oct. 25, 2004, now Pat. No. 7,651,031.

(51) Int. Cl.
*G06K 19/06* (2006.01)
(52) U.S. Cl. ........................................ 235/491; 235/494
(58) Field of Classification Search .................. 235/491, 235/494, 468
See application file for complete search history.

(56) References Cited

U.S. PATENT DOCUMENTS

| 3,239,815 A | 3/1966 | Martens |
| 3,245,697 A | 4/1966 | Nugent |
| 3,455,577 A | 7/1969 | Kikumoto |
| 3,468,046 A | 9/1969 | Makishima |
| 3,477,156 A | 11/1969 | Naito |
| 3,536,894 A | 10/1970 | Travioli |
| 3,621,249 A | 11/1971 | Kikumoto |
| 3,640,009 A | 2/1972 | Komiyama |
| 3,802,101 A | 4/1974 | Scantlin |
| 3,829,662 A | 8/1974 | Furahashi |
| 3,891,829 A | 6/1975 | Dobras |
| 3,918,029 A | 11/1975 | Lemelson |
| 3,919,447 A | 11/1975 | Kilmer et al. |
| 4,044,231 A | 8/1977 | Beck et al. |
| 4,210,916 A | 7/1980 | Mansukhani |
| 4,264,366 A | 4/1981 | Peng |
| 4,312,915 A | 1/1982 | Fan |
| 4,359,633 A | 11/1982 | Bianco |
| 4,417,822 A | 11/1983 | Stein et al. |
| 4,647,774 A | 3/1984 | Brisk et al. |
| 4,521,861 A | 6/1985 | Logan et al. |
| 4,529,633 A | 7/1985 | Karlsson |
| 4,530,961 A | 7/1985 | Nguyen et al. |
| 4,625,101 A | 11/1986 | Hinks et al. |
| 4,627,819 A | 12/1986 | Burrows |
| 4,647,775 A | 3/1987 | Stein |

(Continued)

FOREIGN PATENT DOCUMENTS

AU 743 556 B2 1/2002

(Continued)

OTHER PUBLICATIONS

"Thermoelectric Module System Design," INB Products, Inc., http://www.inbthermoelectric.com/design.html, Erwin St., Van Nuys, CA 91411, pp. 1-3., accessed on Jul. 12, 2004.

(Continued)

*Primary Examiner* — Daniel Hess
(74) *Attorney, Agent, or Firm* — Kramer Levin Naftalis & Frankel LLP (57) ABSTRACT

Detection systems that detect and decode machine-readable information and other indicia having varying spectral emissivity values are provided. The detection systems include a sensor, circuitry, and temperature influencing mechanism. The system may be connected to other hardware, such as a computer display screen, or audio emitting device. Meanwhile, the sensor detects differential emissivity values by measuring energy emitted from the targets of interest.

36 Claims, 5 Drawing Sheets

U.S. PATENT DOCUMENTS

| | | |
|---|---|---|
| 4,708,493 A | 11/1987 | Stein |
| 4,840,496 A | 6/1989 | Elleman et al. |
| 4,840,674 A | 6/1989 | Schwarz |
| 4,888,475 A | 12/1989 | Müllenmeister |
| 4,889,367 A | 12/1989 | Miller |
| 4,910,185 A | 3/1990 | Stake et al. |
| 4,919,542 A | 4/1990 | Nulman et al. |
| 5,036,099 A | 7/1991 | Allen |
| 5,155,080 A | 10/1992 | Elder et al. |
| 5,166,080 A | 11/1992 | Schietinger et al. |
| 5,184,148 A | 2/1993 | Suga et al. |
| 5,259,907 A | 11/1993 | Soules et al. |
| 5,281,261 A | 1/1994 | Lin |
| 5,282,017 A | 1/1994 | Kasindorf et al. |
| 5,294,198 A | 3/1994 | Schlagheck |
| 5,296,887 A | 3/1994 | Zander |
| 5,308,161 A | 5/1994 | Stein |
| 5,315,098 A | 5/1994 | Tow |
| 5,393,148 A | 2/1995 | Berson |
| 5,401,960 A | 3/1995 | Fisun et al. |
| 5,460,451 A | 10/1995 | Wadman |
| 5,568,177 A | 10/1996 | Talvalkar et al. |
| 5,568,555 A | 10/1996 | Shamir |
| 5,571,311 A | 11/1996 | Belmont et al. |
| 5,582,103 A | 12/1996 | Tanaka et al. |
| 5,597,237 A | 1/1997 | Stein |
| 5,597,997 A | 1/1997 | Obata et al. |
| 5,648,650 A | 7/1997 | Sugifune et al. |
| 5,653,844 A | 8/1997 | Abrams |
| 5,686,725 A | 11/1997 | Maruyama et al. |
| 5,701,538 A | 12/1997 | Yasui |
| 5,704,712 A | 1/1998 | Stein |
| 5,709,918 A | 1/1998 | Kimijima et al. |
| 5,814,806 A | 9/1998 | Tanaka et al. |
| 5,861,618 A | 1/1999 | Berson |
| 5,906,678 A | 5/1999 | Fujiyama et al. |
| 5,908,527 A | 6/1999 | Abrams |
| 5,963,662 A | 10/1999 | Vachtsevanos et al. |
| 5,971,276 A | 10/1999 | Sano et al. |
| 5,973,598 A | 10/1999 | Beigel |
| 5,981,040 A | 11/1999 | Rich et al. |
| 6,001,510 A | 12/1999 | Meng et al. |
| 6,019,865 A | 2/2000 | Palmer et al. |
| 6,025,926 A | 2/2000 | Smith et al. |
| 6,027,027 A | 2/2000 | Smithgall |
| 6,039,257 A | 3/2000 | Berson et al. |
| 6,069,190 A | 5/2000 | Bates et al. |
| 6,095,682 A | 8/2000 | Hollander et al. |
| 6,104,291 A | 8/2000 | Beauvillier et al. |
| 6,123,263 A | 9/2000 | Feng |
| 6,130,613 A | 10/2000 | Eberhardt et al. |
| 6,168,081 B1 * | 1/2001 | Urano et al. ............. 235/462.27 |
| 6,191,851 B1 | 2/2001 | Kirkham et al. |
| 6,203,069 B1 | 3/2001 | Outwater et al. |
| 6,234,537 B1 | 5/2001 | Gutmann et al. |
| 6,246,326 B1 | 6/2001 | Wiklof et al. |
| 6,255,948 B1 | 7/2001 | Wolpert et al. |
| 6,271,793 B1 | 8/2001 | Brady et al. |
| 6,274,873 B1 | 8/2001 | Outwater et al. |
| 6,280,069 B1 | 8/2001 | Pastrick et al. |
| 6,280,544 B1 | 8/2001 | Fox |
| 6,294,998 B1 | 9/2001 | Adams et al. |
| 6,299,346 B1 | 10/2001 | Shalom et al. |
| 6,309,690 B1 | 10/2001 | Brogger et al. |
| 6,335,686 B1 | 1/2002 | Goff et al. |
| 6,352,751 B1 | 3/2002 | Miles et al. |
| 6,354,501 B1 | 3/2002 | Outwater et al. |
| 6,355,598 B1 | 3/2002 | Takeda et al. |
| 6,471,126 B2 | 10/2002 | Urano et al. |
| 6,481,907 B2 | 11/2002 | Banach et al. |
| 6,486,783 B1 | 11/2002 | Hauslade et al. |
| 6,508,399 B2 | 1/2003 | Sasaki et al. |
| 6,514,367 B1 | 2/2003 | Leighton |
| 6,543,808 B1 | 4/2003 | Mitchell et al. |
| 6,549,176 B2 | 4/2003 | Hausladen |
| 6,557,758 B1 | 5/2003 | Monico |
| 6,561,422 B1 | 5/2003 | Cariffe |
| 6,576,155 B1 | 6/2003 | Barbera-Guillem |
| 6,593,853 B1 | 7/2003 | Barrett et al. |
| 6,610,351 B2 | 8/2003 | Shchegolik et al. |
| 6,610,386 B2 | 8/2003 | Williams et al. |
| 6,612,494 B1 | 9/2003 | Outwater |
| 6,662,430 B2 | 12/2003 | Brady et al. |
| 6,669,093 B1 | 12/2003 | Meyerson et al. |
| 6,677,917 B2 | 1/2004 | Heerden et al. |
| 6,685,094 B2 | 2/2004 | Cameron et al. |
| 6,693,541 B2 | 2/2004 | Egbert |
| 6,700,491 B2 | 3/2004 | Shafer |
| 6,701,605 B2 | 3/2004 | Huffer et al. |
| 6,702,185 B1 | 3/2004 | Zercher |
| 6,712,272 B2 | 3/2004 | Urano et al. |
| 6,741,178 B1 | 5/2004 | Tuttle |
| 6,752,430 B2 | 6/2004 | Holt et al. |
| 6,784,761 B2 | 8/2004 | Takeda et al. |
| 6,793,138 B2 | 9/2004 | Saito |
| 6,857,573 B2 | 2/2005 | Urano et al. |
| 6,857,714 B2 | 2/2005 | Hohberger et al. |
| 6,874,639 B2 | 4/2005 | Lawandy |
| 7,038,276 B2 | 5/2006 | Ker et al. |
| 7,038,766 B2 | 5/2006 | Kerns et al. |
| 7,044,386 B2 | 5/2006 | Berson |
| 7,079,230 B1 | 7/2006 | McInerney et al. |
| 7,093,767 B2 | 8/2006 | Faenza et al. |
| 7,102,520 B2 | 9/2006 | Liu et al. |
| 7,172,670 B2 | 2/2007 | Franko |
| 7,242,996 B2 | 7/2007 | Roesner |
| 7,261,479 B2 | 8/2007 | Barrus et al. |
| 7,267,285 B2 | 9/2007 | Berson |
| 7,407,195 B2 | 8/2008 | Berson |
| 7,619,520 B2 | 11/2009 | Berson |
| 7,621,451 B2 | 11/2009 | Berson |
| 7,648,074 B2 | 1/2010 | Attenberger et al. |
| 7,651,031 B2 | 1/2010 | Berson |
| 2001/0024160 A1 | 9/2001 | Banach et al. |
| 2001/0030628 A1 | 10/2001 | Brady et al. |
| 2001/0048028 A1 | 12/2001 | Sasaki |
| 2002/0054201 A1 | 5/2002 | Takeda et al. |
| 2002/0056756 A1 | 5/2002 | Cameron et al. |
| 2002/0134842 A1 | 9/2002 | Brunet |
| 2003/0006170 A1 | 1/2003 | Lawandy |
| 2003/0014288 A1 | 1/2003 | Clarke et al. |
| 2003/0062119 A1 | 4/2003 | Hohberger et al. |
| 2003/0146288 A1 | 8/2003 | Berson |
| 2004/0070503 A1 | 4/2004 | Monahan |
| 2004/0141790 A1 | 7/2004 | Waters |
| 2004/0175515 A1 | 9/2004 | Lawrence et al. |
| 2004/0175548 A1 | 9/2004 | Lawrence et al. |
| 2004/0175550 A1 | 9/2004 | Lawrence et al. |
| 2004/0200061 A1 | 10/2004 | Coleman et al. |
| 2004/0215350 A1 | 10/2004 | Roesner |
| 2005/0035924 A1 | 2/2005 | Liu et al. |
| 2005/0230962 A1 | 10/2005 | Berson |
| 2006/0086803 A1 | 4/2006 | Berson |
| 2006/0127154 A1 | 6/2006 | Barrus et al. |
| 2006/0163363 A1 | 7/2006 | Berson |
| 2006/0170436 A1 | 8/2006 | Berson |
| 2006/0170557 A1 | 8/2006 | Berson |
| 2006/0171756 A1 | 8/2006 | Berson |
| 2006/0171757 A1 | 8/2006 | Berson |
| 2007/0009732 A1 | 1/2007 | Tsai et al. |
| 2008/0282593 A1 | 11/2008 | Berson |

FOREIGN PATENT DOCUMENTS

| | | |
|---|---|---|
| EP | 0 535 881 | 4/1993 |
| EP | 0 697 673 | 2/1996 |
| JP | 9-161002 | 6/1997 |
| WO | WO 00/16278 | 3/2000 |
| WO | 03/043830 | 5/2003 |

OTHER PUBLICATIONS

"Application Note Radiometric Temperature: Concepts and Solutions," Santa Barbara Infrared, Inc., 30 South Calle Cesar Chavez, Suite D, Santa Barbara, CA, www.SBIR.com.

"Automatic Identification and Data Capture," Bear Stearns & Co., Inc., pp. 1-74, Jun. 2003.

"Hitachi Develops RFID Chip for Bank Notes, Documents," IDG News Service, www.IDG.net, pp. 1-6., accessed on Oct. 12, 2006.

"RFID Antennas Webpage of Graphic Solutions International LLC," http://www.grpahicssolutionsinc.com/rfid.htm.

"Thermoelectric Module System Design," INB Products, Inc., http://www.inbthermoelectric.com/thermo.html, Erwin St., Van Nuys, CA 91411, p. 1, accessed on Jul. 12, 2004.

"Thermopile Module Low Cost Non Contact Temperature Measurement Technical Data" (Webpage), www.bnboptp.co.kr/sensors/tps/technicaldata1.htm, (printed Oct. 6, 2004), pp. 1-9.

"Understanding Thermopile Infrared Sensors" (Webpage), B+B Corporation south Korea, copyright 2000, www.bnbopto.co.kr/sensors/typs/typs_infor.htm (printed Jul. 12, 2004), pp. 1-5.

"World RFID-based Application Markets-A686-11," Frost & Sullivan, Palo Alto, California, 2004.

Collins, Jonathan, "The Cost of Wal-Mart's RFID Edict," RFID Journal, http://www.rfidjournal.com/article/articleview/572/1/1, Sep. 10, 2003.

Fraser III, John A., "The use of Encrypted, Coded and Secret Communications in an Ancient Liberty Protected by the United States Constitution," Virginia Journal of Law and Technology, University of Virginia, vol. 2, Fall 1997.

Lee, Youbok, Ph.D., "RFID Tag and COB Development Guide with Microship's RFID Devices,(AN830)" Microchip Technology, Inc., pp. 1-25, 2002.

Morley, Gearoid, "Radio Frequency ID Tags," Automation Research Centre, University of Limerick, Aug. 2003.

Reynolds, Matt, "The Physics of RFID," ThingMagic LLC.

Roberti, Mark, "$10K and No Takers," RFID Journal, http://www.rfidjournal.com/article/articleview/1270/1/2, Dec. 6, 2004.

Roberti, Mark, "Sticker Shock," RFID Journal, http://www.rfidjournal.com/article/articleview/1002/1/2, Jun. 28, 2004.

Roeser and Weasel, "Handbook of Chemistry and Physics," Chemical Rubber Company, 49th Edition, 1968, pp., E-228 and F-76.

Shulman, David, "An Annotated Bibliography of Cryptography," New York, London: Garland Publishing Co., pp. 6-13.

Wilkens, John, "Mercury, or the Secret and Swift Messenger," Kessinger Publishing, Chapter V, pp. 37-41.

Yoshida, Junko, "Euro Bank Notes to Embed RFID Chips by 2005," EE Times, pp. 1-6, Dec. 19, 2001.

* cited by examiner

SYSTEMS AND METHODS FOR READING INDICIUM

CROSS-REFERENCE TO RELATED APPLICATION

This application is a continuation of U.S. patent application Ser. No. 10/973,926, filed Oct. 25, 2004, now U.S. Pat. No. 7,651,031, which is fully incorporated herein by reference.

BACKGROUND OF THE INVENTION

This invention relates generally to scanners. More particularly, this invention relates to scanners that may be used to read hidden indicia, machine-readable codes and other types of markings that have varying emissivity values.

Various marking techniques have been used for identification and authentication purposes. For example, machine-readable codes (e.g., bar codes, 2D matrices, etc.) and other types of indicia have been used to attach important information to documents and other types of products such as pharmaceuticals, clothing, and retail accessories. Such machine-readable codes traditionally include information of the origin, manufacturer, history, ownership, and/or other features or details of the product to which the code is attached. Many goods to be distributed, such as pharmaceutical products, postage labels, packages, etc., often use bar-codes to provide manufacturing, shipping, packaging, and other product information. Alternately, retail product labeling traditionally utilizes machine-readable codes to provide pricing information for particular products.

As the need for protection against counterfeiting has increased, the use of various types of "invisible" marking techniques have become more prevalent. Ultraviolet (UV) and infrared (IR) scanning and imaging systems, for example, are now widely used to detect non-visible information. Such systems traditionally rely on reflected light to detect special inks with particular properties related to a particular wavelength of light. One benefit of using these systems is that the special inks may not be visible when illuminated with light from the visible spectrum (i.e., about 400-700 nm). In this manner, an individual is unable to tell whether the product contains "invisible" markings with the naked eye. These special inks, however, are traditionally visible when illuminated with light in the UV spectrum and/or IR spectrum, respectively.

Magnetic materials have also been utilized as part of machine-readable codes. Such magnetic indicia are detected by immersing the magnetic indicia into an electromagnetic field.

Despite the early success of the above-described types of detection systems, these systems have become vulnerable to alternate forms of detection. For example, hidden indicia using special inks can be detected or even made visible through the interaction of the ink with radiation. It is therefore desirable to provide improved machine-readable codes or indicia that is protected from alternate forms of detection.

Furthermore, many traditional types of indicia and detection systems have proven to be susceptible not only to detection, but also to copying. For example, traditional bar codes that may be found on food products, driver's licenses, or retail accessories may be copied with a Xerox machine. The information stored in the original bar code may then be extracted from the Xerox generated bar code with very little (if any) extra effort. Moreover, the information stored in the Xerox generated bar code may be extracted using the same detection device necessary to extract the information stored in the original bar code.

Invisible and hidden indicia may also be copied with, for example, conventional office supplies (such as highlighters and UV light bulbs). The use of traditional types of hidden indicia may be copied so easily that amusement parks, for example, do not rely on hidden indicia alone. When stamping patrons' hands for readmission, many amusement parks use invisible ink that may be detected by UV light. In addition many amusement parks change the shape of the stamp on a daily basis (as a security measure) because the ink is so easily obtained and reproduced.

Generally, many detection systems that detect and/or read bar-codes or other types of markings may detect markings that are visible or become visible when presented with a source of energy (e.g., barcodes on boxes). These markings are read by reflection or absorption of an impinging radiation source. The required source of radiation generally has to correspond to the light reflection or absorption properties of the markings. As such, these systems cannot detect markings, which contain information that is not encoded by means other than light reflection. Nor may these systems detect markings that do not become visible even when presented with radiation. It therefore is desirable to have systems and methods that may detect invisible indicia and decipher potential codes without using reflected energy.

SUMMARY OF THE INVENTION

It is therefore an object of the present invention to provide indicia with particular emissivity values at a given temperature. It is also an object of the present invention to provide detection systems and methods that may locate and decode the same.

These and other objects of the present invention are accomplished in accordance with the principles of the present invention by providing detection systems and methods that may include a differential emissivity sensor, energy generating device, and circuitry for detecting and extracting data from indicia. An indicium may be any type of marking representing or storing information that may be read and/or decoded. The indicium may also be any substance used to modify a substrate (e.g., inks, textures, paints, chemicals, fabric, adhesives, biological materials, etc.). In some embodiments, the indicium may be at least similar in visual appearance and texture to another indicium or indicia located locally. However, the indicium or indicia may have a different emissivity value than the other indicium located locally. The indicium may be composed of a plurality of elements that have the same emissivity value. In this manner, the indicium may have a single emissivity value.

The indicium, in some embodiments, may be composed of two or more elements that have different emissivity values. In this manner, the indicium may be a combination or series of different elements, with varying emissivity values, located relatively close to each other. An example would be bars of a barcode, in which the indicium is the entire barcode consisting of black bars separated by white bars. The black bars would be different elements of the indicium than the white bars. However, unlike a standard barcode, a barcode utilizing differential emissivity values to distinguish the bars from the spaces may have no visual difference and the bars and spaces may be the same color, texture, etc.

In some embodiments, the indicium may be at least similar in visual appearance to the substrate or object the indicium is modifying. The substrate may be any object that can be modified (paper, adhesive, metal, plastic, fabric, glass, pavement, cement, gems, etc.). The substrate may have an emissivity value that is different than the emissivity values of the indicium. Intervening layers of different substances between the substrate and indicium may or may not be included and may have different emissivity values than the elements of the indicium.

In some embodiments of the present invention, the sensor may detect the difference in the emissivity values of elements of the indicium and, if necessary, the substrate the indicium resides on. Differential emissivity is the relative ability of a given indicium, element of an indicium, etc. to emit radiant and/or thermal energy compared to that of another indicium, element of an indicium, etc. at the same temperature and with the same area. If the indicium or if the indicium and the substrate the indicium is on are known to have nearly identical temperatures, then apparent differences in radiometric temperature measurements must be due to varying emissivity values.

In some embodiments, it may be desirable for the temperature of the indicium to differ from the temperature of the environment surrounding the sensor. The environment surrounding the sensor may be anything the sensor uses as a temperature reference (e.g., the space closer to the sensor than the indicium, an apparatus surrounding or in proximity to the sensor, the gas around the indicia and substrate, the area between the sensor and the indicium, the area in closer proximity to the sensor than the indicia, etc.).

The use of, for example, a thermal shield or any other heating or cooling apparatus serves to vary the temperature of the environment surrounding the sensor.

If the temperature of the indicium and substrate are nearly the same, and are different from that of the environment surrounding the sensor, then differences in detected radiated thermal energy may be due to varying emissivity values. To elevate the temperature of the indicium, substrate, etc. above the temperature of the environment surrounding the sensor, detection systems of the present invention may supply different forms of energy to the indicium, substrate, etc. The different forms of energy may affect any combination of temperatures of the elements of the indicium, indicia, the substrate, the environment surrounding the sensor, etc. Different energy sources may be combined in some embodiments.

Some embodiments of the present invention may also include circuitry to control and coordinate system functionality and decode data. Such circuitry may be located inside, or external to, the detection systems. Such detection systems may be configured as a scanning device, an imaging device, or any other device that generally detects elements of an indicium due to the varying emissivity values. As mentioned above, in some embodiments, the differential emissivity values of elements of the indicium or a plurality of indicia may be arranged in such a manner that it contains machine-readable or coded information. The circuitry may enable a detection system to be utilized anywhere that indicium is present.

In some embodiments, a detection system is provided that uses a thermal energy source (e.g., a flash lamp) to influence the temperature of the indicium and, if necessary, the substrate which the indicium resides. It may not be necessary to reference the emissivity value of the substrate if varying emissivity values are otherwise present (e.g., a plurality of elements of an indicium having varying emissivity values, indicia having varying emissivity values, etc.). The location of each element within the indicium may then be determined by means of the differential emissivity values of the elements. Varying emissivity values of the indicium may be located because the energy radiated from a particular area of the indicium, per unit time, may be detected and compared to another area of the indicium, other indicia, or anything else with an emissivity value. If data is stored in the particular arrangement of the indicium, the meaning may be extracted and/or decoded.

In some embodiments, a detection system is provided that applies at least one electromagnetic pulse to affect the temperature of the indicium. A current in a solenoid, a magnet in motion, or any other suitable arrangement may be used to induce an electromagnetic pulse. The electromagnetic pulse may affect the temperature of the indicium (and the elements of the indicium) by, for example, inducing an electrical current in a background layer located in close proximity to the indicium. The background layer may be, for example, an intervening layer located between the indicium and the substrate. The background layer may have an emissivity value that is different than any of the emissivity values present in the indicium. In this manner, the elements of the indicium may be detected respective to the background layer. The temperature of the indicium may be influenced so that the temperature of the environment surrounding the sensor remains ambient, or at least different, from the temperature of the indicium and the background layer.

In some embodiments of the present invention, a detection system may be provided that influences the temperature of the environment surrounding the sensor by providing a thermal shield. Doing so may, for example, provide a difference in temperature between the environment surrounding the sensor and the temperature of the indicium. More specifically, the temperature of the indicium may remain ambient and the background temperature may increase or decrease to enable the sensor to detect the differential emissivity values of the indicium or the elements of an indicium.

A detection system may also be provided that may detect and decode multiple properties of indicium. Such a system may be able to detect and decode data stored by indicium due to the differential emissivity values of elements of different indicia in addition to a combination of any of the other properties of the indicium (e.g., emissivity, IR, UV, visual, magnetic, etc.). A utilization of this embodiment may allow indicium with elements having different types of properties (e.g., emissivity, IR, UV, visual, etc.) to be layered on each other. Each indicium may contain one or more different machine-readable codes that may be detected after exposures to a particular energy source. For example, an indicium that is a traditional bar code may be located on a portion of a substrate. An indicium that is an emissivity bar code may also be located on the same portion of the substrate that the traditional bar code indicium is located. The traditional bar code indicium may be able to verify product information, while the emissivity bar code indicium may be able to verify product authenticity.

Circuitry may be included to decode any code present in indicium. In addition to decoding or interpreting data, in some embodiments, the circuitry may also be able to characterize the indicium (e.g., the type of substance or ink) present on the surface based upon any of the properties detected. Furthermore, the system may be used to identify the particular substance(s) comprising indicia. For example, such a system may be able to differentiate and identify markings on a substrate (e.g., a wall or floor) as red paint, blood, ketchup, etc.

BRIEF DESCRIPTION OF THE DRAWINGS

The above and other features of the present invention, its nature and various advantages will be more apparent upon consideration of the following detailed description, taken in conjunction with the accompanying drawings, in which like reference characters refer to like parts throughout, and in which.

DETAILED DESCRIPTION OF THE INVENTION

Additional types of indicium and labeling are respectively disclosed in commonly owned, co-pending U.S. patent application Ser. No. 10/355,670, filed Feb. 1, 2003, entitled "Information Encoding On Surfaces By Varying Spectral Emissivity," and Ser. No. 10/824,975, filed Apr. 14, 2004, entitled "Label For Receiving Indicia Having Variable Spectral Emissivity Values," which are hereby incorporated by reference in their entirety.

Figure 1:
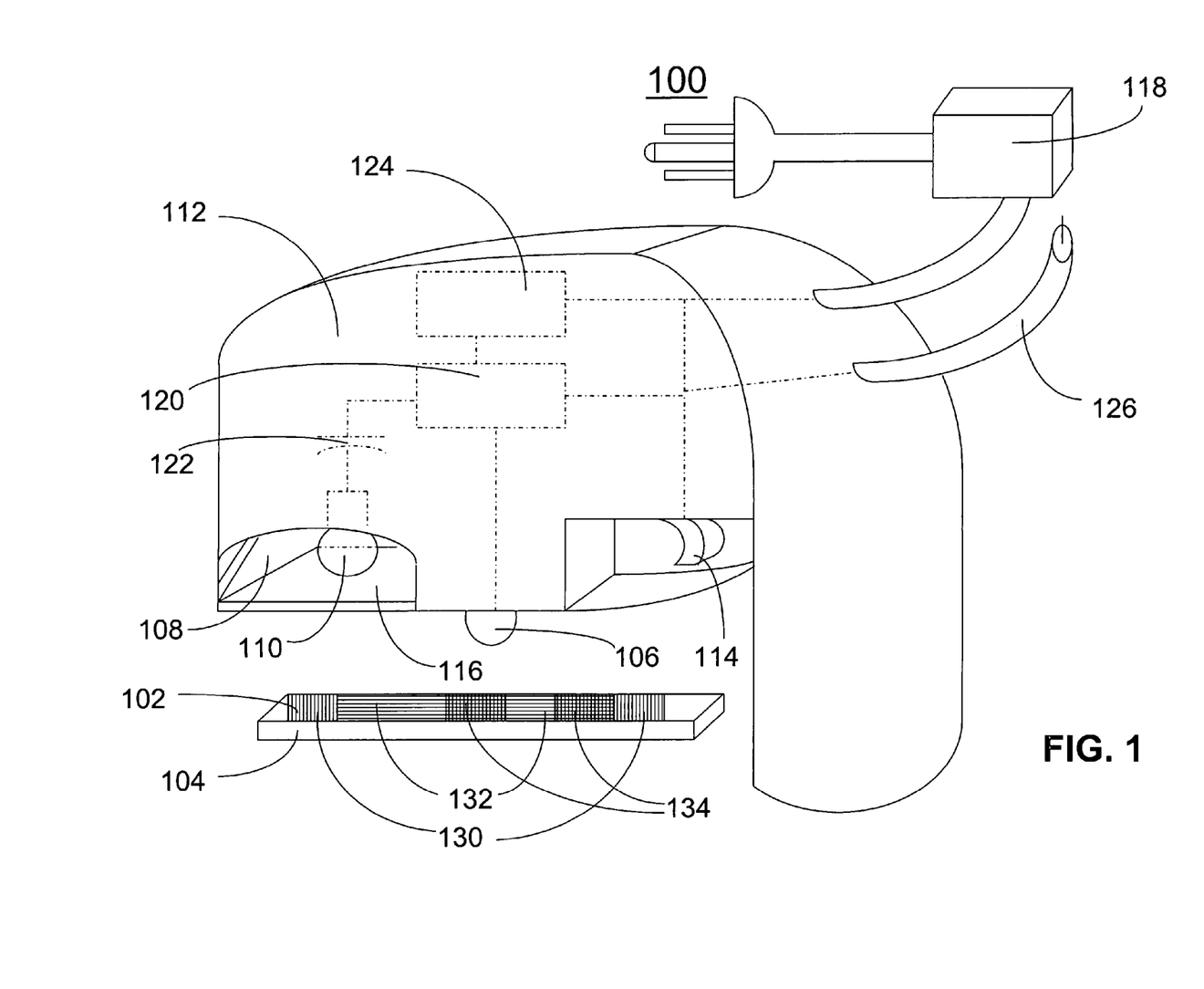
FIG. 1 is an illustration of one embodiment of a detection system constructed in accordance with the principles of the present invention in which the detection system includes a thermal energy source.

FIG. 1 shows system 100 that detects characteristic properties of indicium 102 on substrate 104, such as the differential emissivity values of indicium 102 and substrate 104.

As illustrated in FIG. 1, element 130 and element 132, for example, may reside on substrate 104. Additionally, element 130 and element 132 may be located on the same portion of substrate 104 as shown by overlap areas 134. Element 130 may have a different emissivity value that element 132. Furthermore, overlap area 134 may or may not have an emissivity value that differs from element 130 and/or element 132. These indicia may be collectively referred to as indicium 102. (Examples of the indicium that may make up indicium 102 are further described above in the Summary of the Invention.)

In some embodiments, indicium 102 may be detected due to the difference in the respective emissivity values of indicium 102 and substrate 104. For example, if indicium 102 is a single element or consists of elements with a single emissivity value, then a differential emissivity value may not be present for detection. However, the emissivity value of indicium 102 may differ from the emissivity value of substrate 104 or whatever object indicium 102 is modifying or located locally to. The difference in emissivity values of indicium 102 and substrate 104 may permit system 100 to locate indicium 102 on substrate 104.

In some embodiments, detection system 100 may detect indicium 102 on substrate 104 due to the difference in the respective emissivity values of indicium 102. Indicium 102 may consist of at least two elements (e.g., element 130 and element 132) that have at least two different emissivity values. To allow the emissivity values of indicium 102 to be more pronounced, detection system 100 may include thermal energy source 110 that may affect the temperature of indicium 102, substrate 104, etc. Sensor 106 may then measure the differential emissivity values of indicium 102 on substrate 104. Circuitry 124 may be included to associate a particular data (e.g., 0 or 1, etc.) or multiple data to a particular difference in emissivity reading, or range of differences in emissivity values, such data may then be stored and/or retrieved by system 100.

Thermal energy source 110 may be any type of thermal energy source (such as a flash lamp, IR energy source, etc.). Thermal energy source 110 may be utilized to affect, for example, the temperature of indicium 102. As shown above, particular detection techniques may prefer that the temperature of the indicium 102 is nearly identical, yet different than the temperature of the environment surrounding sensor 106. Accordingly, thermal energy source 110 may affect (e.g., raise) the temperature of indicium 102, without affecting the temperature of the environment surrounding sensor 106 (e.g., the temperature of the environment surrounding the sensor may remain ambient). In this manner, thermal energy source 110 may be focused on, or provided directly to indicium 102.

In some embodiments, it may be desirable for the temperature of indicium 102 to be nearly the same temperature as whatever object and/or substance indicium 102 is on, such as substrate 104. In these embodiments, energy source 110 may affect the temperature of the indicia and the substrate causing the indicium and the substrate to have nearly the same temperature. As described above, the temperature of the indicium and the substrate may differ from the temperature of the environment surrounding sensor 106.

In some embodiments, thermal energy source 110 may serve as a source of IR energy. In this manner, filters may be utilized, such as filter 116, to pass IR radiation, and/or any other necessary wavelength of light, to provide the desired energy to the indicium.

Some embodiments of the present invention may allow for multiple filters to be utilized to detect multiple properties of indicium 102 and/or many indicia. The utilization of multiple filters may allow system 100 to provide different types of energy with the same energy source. The different properties of the indicium may react differently to the varying energy. For example, applying IR energy may elevate the temperature of indicium 102, while applying visible (or white) light may make the color of indicium 102 apparent. Energy source 110 may provide different types of energy by utilizing multiple energy sources or filters, such as one or more of filter 116.

Sufficient electrical power may be provided to operate thermal energy source 110 and the other electrical components of detections system 100. Electrical power may be supplied to the components by, for example, power supply 118, which may be any suitable source of electrical power (e.g., a battery, AC/DC converter, a source of AC Power, etc.). If electrical power is required by thermal energy source 110 and power supply 118 is not sufficient, capacitor 122 may be included. In this manner, capacitor 122 may be electrically coupled between thermal energy source 110 and power supply 118. Capacitor 122 may store energy provided by power supply 118. When sufficient power is required, capacitor 122 may discharge at least some of the stored power. Alternatively, capacitor 122 may be used as a regulator that regulates or limits the amount of power thermal energy source 110, or any of the electrical components, experiences.

Sensor 106 may be included, for example, to measure the differential emissivity or radiometric temperature of indicium 102 and, if necessary, substrate 104. In the some embodiments, sensor 106 may detect the difference in the emissivity of elements of indicium 102. As another example, sensor 106 may measure the relative power of any given surface modification (such as indicium 102) to emit radiant and/or thermal energy compared to that of the surface or background layer at the same temperature and with the same area. Sensor 106 may provide the functionality of or be a plurality of different sensors. Sensor 106 may also measure other characteristics of elements of indicium 102 and substrate 104 (e.g., visual, IR, UV, magnetic, etc.) in addition to the differential emissivity values of elements of indicium 102.

Detection system 100 may detect and locate the elements of indicium 102. The elements of indicium 102 may be detected even when physically located in a manner that is intended to deter counterfeiting. For example, indicium 102 may be placed in a location that may not be readily observable (e.g., the interior of designer purse). In this manner, the possible inclusion of "hidden" indicium by true manufacturers may serve as an equally effective deterrent against potential counterfeiters. Indicium 102 may also be invisible. Alternatively, indicium 102 may be visible, but have a visual appearance and texture that is at least substantially similar to substrate 104 and/or any surrounding indicia or layers with different emissivity values. As such, the elements of indicium 102 may have information that is not apparent to the naked eye while appearing completely normal in all other aspects. Detection system 100 may also be able to detect elements of indicium 102 if it is visible and/or completely different in appearance or texture than substance and/or layer surrounding indicium 102.

Substrate 104 may be the object or substance that indicium 102 is modifying or resides on. For example, substrate 104 may be any object that may be modified (paper, adhesive, metal, plastic, fabric, wood, glass, pavement, stone, cement, gems, etc.).

In some embodiments, indicium 102 may be located on any portion of substrate 104. Indicium 102 may have a different emissivity value than substrate 104. The temperature of, for example, substrate 104 and indicium 102 (or any other modifications to substrate 104) may be affected by an energy source. Additionally, the different emissivity values may allow the location of particular indicium or indicia to be identified relative to substrate 104. Detection system 100 may locate elements of indicium 102 by detecting the varying emissivity values.

Detection system 100 may be provided to read machine-readable information and/or decipher codes stored by elements of indicium 102 on substrate 104. In this manner, codes may be deciphered to provide information, or data, to a user or machine. The deciphered information may then be delivered to another system or device that may in turn utilize, manipulate, and/or further modify the deciphered information. Additional decoding procedures may also be provided in any other system or device that system 100 may be coupled to.

Emissivity differentials of elements of indicium 102 may be arranged in at least two patterns on substrate 104. If desired, multiple indicia each with a plurality of elements having varying emissivity values may be utilized and arranged in multiple patterns on substrate 104. The difference in the emissivity values may be known or unknown. Also, for example, multiple substrates may be utilized and positioned local to each other, thus creating a pattern of different substrates with different emissivity values. In this manner, the substrates collectively would represent an indicium with each substrate representing an element of the indicium. Any of these patterns may be used to form codes or other type of markings that represent and/or store information. The codes may be machine-readable, human-readable or both. For example, a human-readable code may be represented by invisible indicia. In that case, the invisible indicia would be detected due to the varying emissivity of the indicia by system 100, and the image of the human-readable code would then be displayed on a display screen so a person could read it. In general, these patterns may be indistinguishable from their surroundings and the codes may contain data and/or information.

As another example, elements of indicium 102 may be organized to store data as a bar code. The bar code may be a traditional bar code (e.g., a series of parallel lines varying in width with varying sized spaces in between lines) or an unconventional bar code (e.g., two dimensional data matrix, etc.). For example, in a traditional code the thickness of the lines and spaces represent information. As described above, the temperature of indicium 102 may be affected by thermal energy source 110. In such a manner the temperature may be elevated above ambient, while the temperature surrounding sensor 106 remains ambient. Sensor 106 may then detect the emissivity values of elements of indicium 102. For example, a traditional bar code may be implemented. In such a manner, each line of the bar code would have the same emissivity value. The emissivity value of the lines of the bar code may differ from the substrate or indicium located between the lines.

If multiple indicia or multiple substrates are provided, system 100 may detect the differential emissivity values of each relative to any emissivity values local to the indicia or substrate of interest.

Detection system 100 may be configured to detect other types of coded information. For example, system 100 may detect information coded by the arrangement of many emissivity values (rather than just two different emissivity values such as the black and white bars of a traditional code). This may provide a bar code that, for example, can store more information with the same area of indicium because each line of the bar code may be one of a plurality of differential emissivity values. In this manner, each line of a bar code using emissivity may be able to represent a hexadecimal number (0-f) or any other base number instead of the conventional "1" or "0" (e.g., "black" or "white", "absorbed" or "reflected", etc.). Accordingly, a particular emissivity value may also be correlated to a particular data state or word.

To detect codes that utilize different base numbers, detection system 100 may measure the varying emissivity values of different elements of indicium 102 and decoding circuitry 124 may assign related data to the measurement based on the emissivity differential. Thus, each line or pixel of an emissivity code may represent multiple bits of information due to the emissivity of the indicium alone (without taking the width of the line and space into consideration).

Persons skilled in the art will appreciate that the elements of indicium 102 may be provided in any coded fashion to represent any given data. In this manner, the codes described herein are not limited to a particular type of code such as, for example, a bar code.

In alternate embodiments, detection system 100 may detect other properties (e.g., UV, IR, magnetic, color, etc.) of elements of indicium 102 or other indicia that may characterize the different indicia. The other characteristics may differentiate indicium 102 from substrate 104, other indicia and/or intervening layers, despite similar or virtually identical emissivity values. This may be utilized, for example, as described above, to layer multiple inks containing different codes on the same portion of substrate 104. Each code may then be detected due to properties unique to the elements of the indicium in which the code is represented.

Alternatively, system 100 may detect other properties for the purpose of identifying the material or materials elements of indicium 102, substrate 104, and/or any other layers may be comprised of. For example, system 100 may be able to detect different characteristics of indicium 102 (e.g., emissivity, IR, UV, magnetic, visual, etc.) and determine that it is blood (or any other substance) due to the different properties of blood. Furthermore, system 100 may be able to detect locations where different substances once, but no longer modify a substrate. For example, blood may have been present on a surface, but the visible indication of blood was removed when the surface was cleaned. System 100 may be able to locate where the blood was located by detecting invisible properties or combinations of properties (such as emissivity) that may have been left behind.

Detection system 100 may include reflector 108, body 112, trigger 114, control circuitry 120, decoding circuitry 124 and cable 126.

Reflector 108 may be utilized to direct the energy from thermal energy source 110 to particular portions of substrate 104, magnify particular portions of substrate 104, and/or enhance the effect of energy source 110 among other things. In this manner, reflector 108 may be located in proximity of sensor 106. Multiple reflectors may be included.

Certain components of system 100 may be protected from damage by utilizing body 112. Such components may include, for example, those illustrated in the figures and those that are not, such as wires, electronics, processors, light emitting diodes, wireless antennas, etc. Body 112 may be made from, for example, any type of material that does not inhibit the operation of system 100 (such as, plastic, metal, fiberglass, etc.). Body 112 may be any shape and may be hand held or mounted to an object.

Input and output signals may be provided to and received from detection system 100 via one or more triggers, cables, buttons, or wireless devices. Detection system 100 may also utilize trigger 114 to initiate or control when sensor 106 turns ON or is active. Trigger 114 may be positioned such that sensor 106 may be comfortably activated using the same hand that is holding body 112 (as illustrated in FIG. 1).

Persons skilled in the art will appreciate that trigger 114 may be positioned or shaped in a variety of other ways. For example, trigger 114 may be a button located on body 112 or on a wireless device (e.g., a handheld remote controller, cellular phone, personal computer, a handheld computer, a music player, etc.). Alternatively, a trigger may not be provided to activate a detection system. For example, the system may be configured to constantly scan. As another example, such a system may be activated based on a timer or receipt of a signal that indicates when the sensor should scan, image, read or otherwise detect elements of various indicium on a substrate (e.g., turn ON).

As shown in FIG. 1 and in some embodiments of the present invention, control circuitry 120 may be located in body 112. In this manner control circuitry 120 can easily be coupled to one or more of the components that control circuitry 120 receives input signals from or sends output signals to. Accordingly control circuitry 120 may, for example, coordinate the interaction and operation of any of the components of detection system 100. Such components may include trigger 114, power supply 118, sensor 106, capacitor 122, thermal energy source 110, etc. Control circuitry 120 may run software that is loaded or embedded onto memory (not shown), utilize logic gates (not shown), or utilize any technology currently available for operating a detection system in accordance with the principles of the present invention.

Alternatively, control circuitry 120 may be located remotely with respect to body 112. Control circuitry 120 may be, at least in part, a computer, or any other circuitry capable of controlling detection system 100. Specialized software may be loaded onto a computer, handheld device, or other electronic device that provides the device remote control of or serves as control circuitry 120 of detection system 100. This remote control may operate via infrared, wirelessly using a technology such as Bluetooth™ or via other remote technology.

As described above, elements of indicium 102 may be organized on substrate 104 in such a manner that data and/or information is stored in the arrangement of the elements of the indicium. For example, data may be provided in a coded or encrypted form (such as a bar code) as described above. The detection and measuring of indicium 102 may be performed by sensor 106, while decoding circuitry 124 may perform the deciphering and interpretation of the data. Additionally, decoding circuitry 124 may associate particular electrical signals (e.g., 1 or 0, or using intermediate values as a step function to increase the amount of information stored, etc.) to a particular difference in emissivity values, or range of differences in emissivity values, in order to decipher the codes and extract data stored by differential emissivity. Decoding circuitry 124 may then utilize (e.g., store, retrieve, etc.) the representative signals.

In some embodiments of the present invention, decoding circuitry 124 may produce at least one output that conveys the meaning of the deciphered data to the user. One example may be a display on a display screen of an image that shows the location and arrangement of the elements of indicium 102 (e.g., if it is hidden) on substrate 104. A display on a display screen (not shown) may also be utilized, for example, to convey the meaning of the stored information. Another example may be a text display or printout detailing or stating the meaning of the coded information. An audio signal stating the meaning of the stored information in a language the user understands may be yet another output of decoding circuitry 124. Decoding circuitry 124 may also be configured to indicate if there was an error reading, measuring or decoding indicium 102. The system may utilize multiple outputs simultaneously if desired or configured to do so.

Although display screens, audio speakers, etc. are not shown, one skilled in the art will appreciate that such devices may be easily added to body 112 or remote to body 172. Alternatively, decoding circuitry 124 may be provided external to body 112. Thus, decoding circuitry 124 may communicate with other components of detection system 100 either wirelessly or via direct connections. Moreover, if decoding circuitry 124 is remote from body 112, then a wire, such as cable 126, may be used to couple decoding circuitry 124 to the components inside body 112. Cable 126 may provide data to any internal component from any component external to body 112. Cable 126 may also provide data to any external component from any internal component.

Control circuitry 120 and decoding circuitry 124 may also be used to receive multiple data inputs in addition to other inputs such as, for example, emissivity data inputs. For example, indicium, substrate, and/or other data may be received from sensor 106 or any other sensor containing information about the indicium, substrate, and/or intervening layer. Decoding circuitry 124 may decode this information, or the circuitry may use the measurements or other system inputs to identify a substance. For example, indicium 102 may have particular physical or chemical properties that can be identified using such a sensor or sensors. Decoding circuitry 124 may store the information relating to indicia, substrates, etc. Thus, decoding circuitry 124 may retrieve the information when a property or properties (e.g., emissivity, etc.) have been detected.

Figure 2:
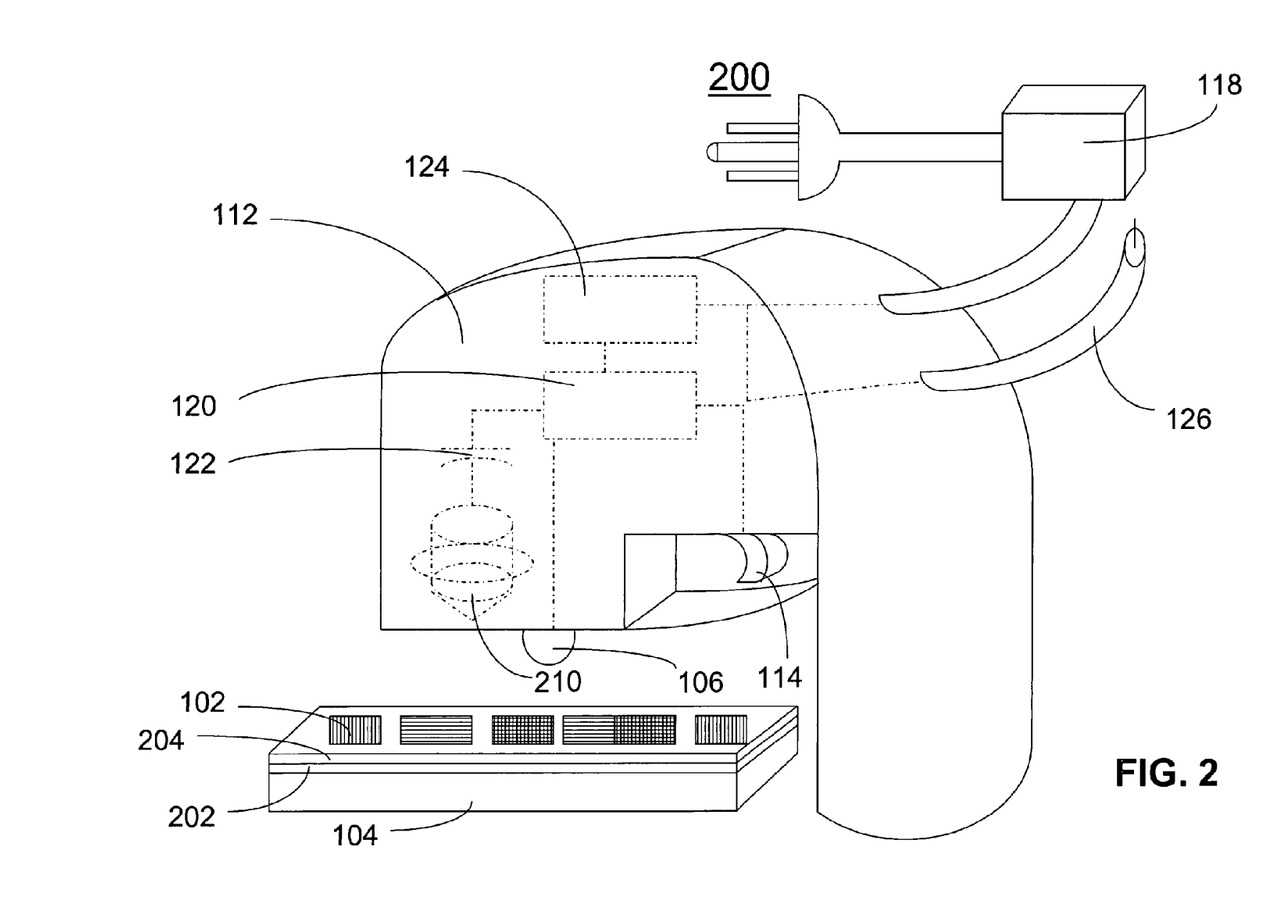
FIG. 2 is an illustration of another embodiment of a detection system constructed in accordance with the principles of the present invention in which the detection system includes an electromagnetic energy source.

Looking at FIG. 2, detection system 200 is provided. Detection system 200 is similar to detection system 100 of FIG. 1. Particularly, components 1XX of FIG. 2 are similar or the same as components 1XX of FIG. 1. Persons skilled in the art will appreciate that, in various embodiments of the present invention, similar or identical components may be utilized to perform similar or identical functions.

FIG. 2 shows detection system 200 that includes electromagnetic energy source 210 instead of thermal energy source 110 to assist in detecting properties of indicium 102 and/or substrate 104 by affecting the temperature of indicium 102 and/or substrate 104. Electromagnetic energy source 210 may be, for example, a solenoid coil, a magnet or any other suitable source of electromagnetic energy. Persons skilled in the art will appreciate that the magnet may be rotated, vibrated, or moved in order to produce electromagnetic energy.

In some embodiments, intervening layers (e.g., background layer 202 and conductive layer 204) may be added between substrate 104 and indicium 102. Background layer 202 may be similar in visual appearance to indicium 102. In such a manner, indicium 102 may be indistinguishable from the remainder of the substrate or other object the substrate is being used with. For example, substrate 104 may be an adhesive, as described above, that is being used to adhere indicium 102 to a sheet of paper or other object. Background layer 202 may be located between substrate 104 and indicium 102, thus serving as an intermediate layer between indicium 102 and substrate 104, while allowing indicium 102 to be adhered to another object other than substrate 104 and background layer 202.

In some embodiments of the present invention, background layer 202 may have a different emissivity value than the elements of indicium 102. Sensor 106 may detect the differential emissivity values. Elements of indicium 102 may store data relative to background layer 202 due to the differential emissivity values of background layer 202 and the elements of indicium 102. For example, a traditional barcode may be represented by indicium 102 on background layer 202. In this manner, the elements of indicium 102 may represent, for example, the black bars and background layer 202 may represent white spaces. This differs than what is described above because in the previous example, different elements of indicium 102 represented black bars and white bars. However in this example, the black bars are represented by the elements of an indicium, while the white spaces is an intervening background layer which indicium 102 modifies.

Some embodiments of the present invention may include conductive layer 204 as an intervening layer between indicium 102 and substrate 104. In some preferred embodiments, thermal energy and electrical current may be conducted through conductive layer 202 due to the conductive properties of conductive layer 202. Persons skilled in the art may appreciate that these properties, in combination with electromagnetic energy source 210, may be utilized to affect the temperature of indicium 102, substrate 104, background layer 204, etc.

For example, electrical current may be induced in conductive layer 202 by electromagnetic energy source 210. This may occur when electromagnetic energy source 210 provides an electromagnetic pulse. The electromagnetic pulse may generate a current in conductive layer 202. Persons skilled in the art will appreciate that the generated current may provide thermal energy to indicium 102 and any other necessary substrate or layer. In this manner, the differential emissivity value, or range of emissivity values, of elements of indicium 102 may be detected and/or associated to a particular data (e.g., "0" or "1"). Conductive layer 202 may be, for example, copper or aluminum tape.

In some embodiments, conductive layer 202 may be located in different locations relative to indicium 102, substrate 104, and other intervening layers (e.g., background layer 204). For example, conductive layer 202 may be placed between indicium 102 and substrate 104. As another example, conductive layer 202 may be located beneath substrate 104, while indicium 102 and/or any intervening layer is located on substrate 104. Alternatively, conductive layer 202 may be located between indicium 102 and another intervening layer. Conductive layer 202 may also be positioned, for example, between substrate 104 and another intervening layer.

Alternatively, the effectiveness of detection system 200 may be increased by utilizing indicia that have a high density of conductors. For example, elements of indicium 102 may be a high solids content copper ink, in which case conductive layer 202 may not be required. Electromagnetic source 210 may be able to induce an electrical current in the ink due to the presence of a high density of conductors. The induced current may then be used to generate thermal energy as described above. The thermal energy present in indicium 102 may allow sensor 106 to detect the differential emissivity of indicium 102. Background layer 204 and/or substrate 104, for example, may also be coated with or be a high solids content copper ink, which may be thermally affected by electromagnetic energy source 210.

Furthermore, electromagnetic energy source 210 may increase the amount of heat energy present in indicium 102, when, for example, substrate 104, background layer 204, and/or indicium 102 provides adequate equalization of surface temperature due to electromagnetic radiation. In this manner, sensor 106 may detect the differential emissivity of indicium 102 (and, if necessary, any other substrate or layer). Additionally, indicium 102 (and, if necessary, any other substrate or layer) may be influenced to nearly the same temperature. In this manner, the temperature of indicium 102 (and, if necessary, any other substrate or layer) may be relatively warmer than the temperature of the environment surrounding sensor 106 due to electromagnetic energy source 210 (as may be desirable).

Figure 3:
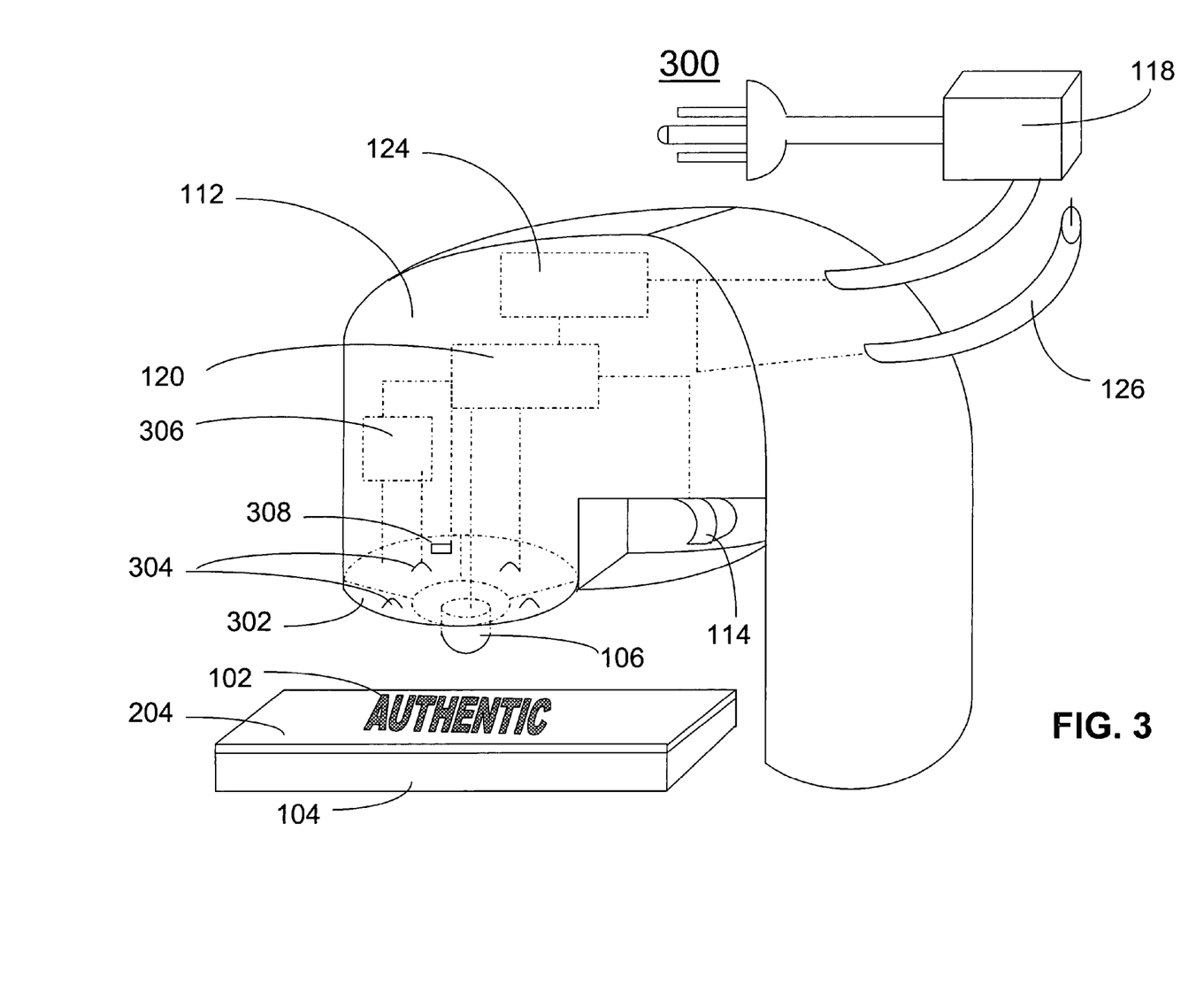
FIG. 3 is an illustration of another embodiment of a detection system constructed in accordance with the principles of the present invention in which the detection system includes a thermal shield.

Looking at FIG. 3, detection system 300 is provided. Detection system 300 is similar to detection system 100 of FIG. 1 and system 200 of FIG. 2. Particularly, components 1XX and 2XX of FIG. 3 are similar or the same as components 1XX of FIGS. 1 and 2XX of FIG. 2 respectively. Persons skilled in the art will appreciate that, in various embodiments of the present invention, similar or identical components may be utilized to perform similar or identical functions.

FIG. 3 shows detection system 300 that is similar to detection system 100. Like detection system 100, detection system 300 also affects temperatures to assist in detecting the differential emissivity of the indicia on substrate 104 so that information stored by the indicia may be retrieved.

However, detection system 300 is unique in that it may include thermal shield 302 to influence the temperature of the environment surrounding sensor 106. In a preferred embodiment, sensor 106 may operate more affectively as described above if the temperature of the environment surrounding the sensor is different than the temperature of indicium 102 (and, if necessary, any other substrate or layer). If the temperature of the environment surrounding sensor 106 is modified while the temperature of indicium 102 remains ambient (or at least different than the temperature of the environment surrounding the sensor), the arrangement of the elements of indicium 102 may be located with sensor 106, as well as any substrate, layer, etc. that has a differential emissivity value. Decoding circuitry 124 may interpret the differential emissivity values and their locations (and any data represented) and convey the relevant information to the user as described above.

In some embodiments of the present invention, system 300 may include thermal shield 302 and other components system 100 does not. For example, shield circuitry 306 may be electrically coupled to both thermal shield 302 and control circuitry 120. Shield circuitry 306 may also be integrated into control circuitry 120. Shield circuitry 306 may be used to monitor and control the functionality of thermal shield 302 via electrical impulses. Temperature elements 304 may be embedded, attached, or otherwise situated in proximity to thermal shield 302 in order to affect the temperature of thermal shield 302. Temperature elements 304 may also be electrically coupled to thermal shield 302, shield circuitry 306 and thermostat 308. Multiple temperature elements may be present within any given area as required to sufficiently influence the temperature of the environment surrounding sensor 106. Sensor 106 may then detect the varying emissivity values when the temperature of the environment surrounding sensor 106 is different than the temperature of indicium 102.

Thermostat 308 may measure temperature readings of thermal shield 302, temperature elements 304, the background layer, or any other components of which the temperature is desired. The temperature readings of thermostat 308 may help the system monitor relevant temperatures. The temperature readings of thermostat 308 may be utilized by any component of detection system 300, or by any component remotely connected to thermostat 308.

In some embodiments the temperature of thermal shield 302 may be the temperature of the environment surrounding sensor 106. In this manner, thermal shield 302 may surround or be located relatively near to sensor 106. For example, sensor 106 may be located behind thermal shield 302. As another example, sensor 106 may protrude through a hole in thermal shield 302 (as illustrated in FIG. 3). As yet another example, sensor 106 may be affixed to thermal shield 302.

In some embodiments, the temperature of the environment surrounding sensor 106 may be raised relative to the temperature of indicium 102 in order to measure varying emissivity values. Increasing the temperature of temperature element 304 may increase the temperature of thermal shield 302 thereby increasing the temperature of the environment surrounding the sensor relative to the temperature of indicium 102, substrate 104 and any intervening layers (that may or may not be included). Increasing the temperature of the environment surrounding the sensor relative to the temperature of indicium 102 may provide a difference in temperature that may enable the varying emissivity values of indicium 102 to be detected.

Detection system 300 may also decrease the temperature of the environment surrounding sensor 106 relative to the temperature of indicium 102. If the temperature of the environment surrounding sensor 106 is lower than the temperature of indicium 102, then the emissivity values of the elements of indicium 102 may affect the rate that elements of indicium 102 absorb thermal energy. For example, background layer 202 would similarly be affected by an energy source, such as thermal shield 302. In that case, sensor 106 may locate and measure the differential emissivity values and provide the related information to decoding circuitry 124 as described above.

Figure 4:
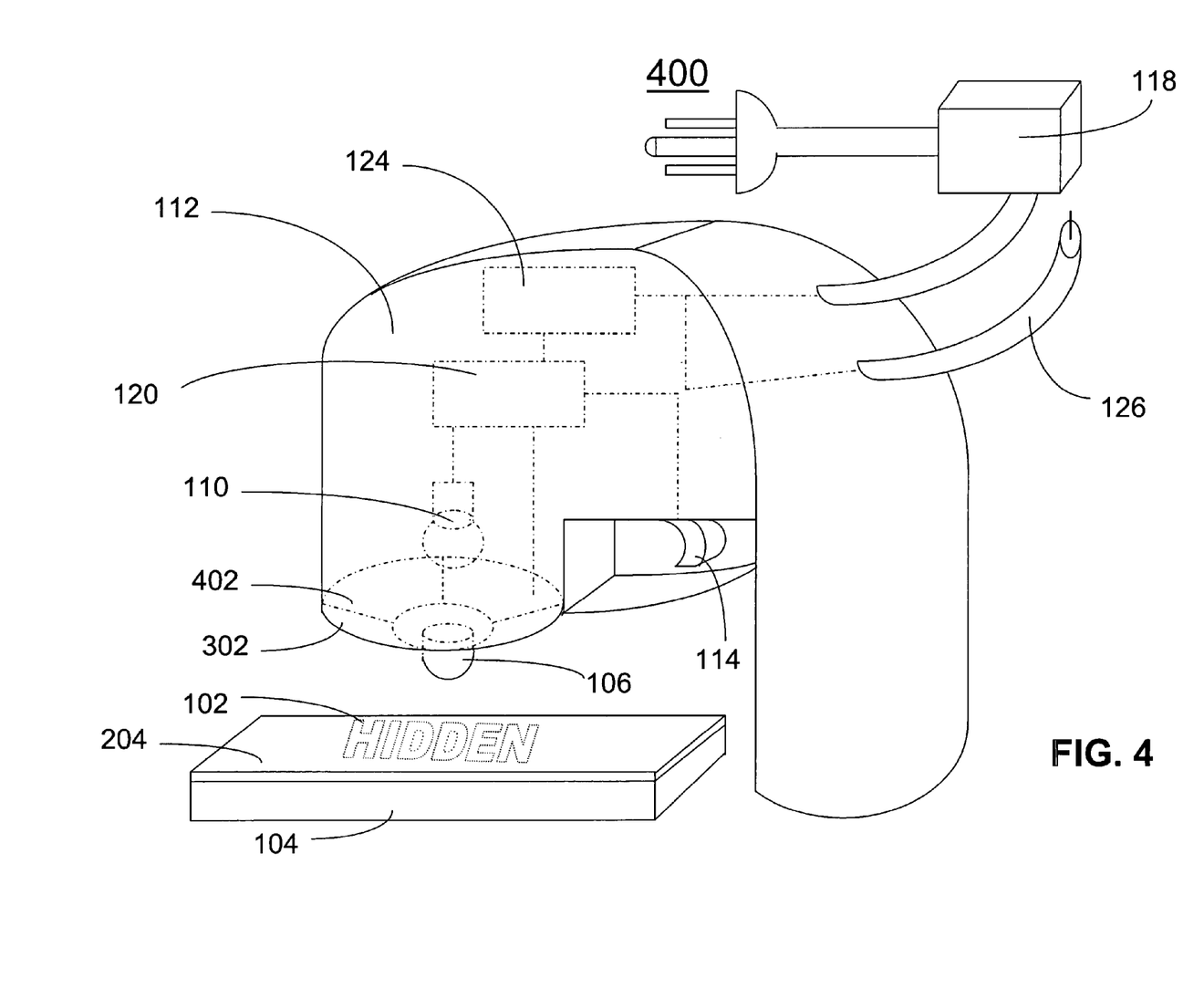
FIG. 4 is an illustration of another embodiment of a detection system constructed in accordance with the principles of the present invention in which detection device includes a thermal shield and a thermal energy source.

In some embodiments of the present invention, a system may be provided that combines the systems described above. For example, FIG. 4 shows detection system 400 that is a combination of system 100 and system 300. System 400 utilizes temperature-affecting devices similar to thermal shield 302 and thermal energy source 110. For example, thermal shield 302 may lower the temperature of the environment surrounding sensor 106, while thermal energy source 110 raises the temperature of indicium 102 and any other layers and/or substrates.

In general, system 300 is similar to detection system 100 of FIG. 1, system 200 of FIG. 2, and system 300 of FIG. 3. Particularly, components 1XX, 2XX, and 3XX of FIG. 3 are similar or the same as components 1XX of FIG. 1, 2XX of FIGS. 2 and 3XX of FIG. 3, respectively. Persons skilled in the art will appreciate that, in various embodiments of the present invention, similar or identical components may be utilized to perform similar or identical functions.

In some embodiments, system 400 may include coating 402, which may absorb energy wavelengths emitted by thermal energy source 110. The wavelengths absorbed may be, for example, wavelengths that may prevent the emissivity values from being measured properly by sensor 106. As another example, the wavelengths absorbed may be particular harmful or unnecessary wavelengths of light or energy. In some embodiments, the absorbed wavelengths may affect the temperature of thermal shield 302, which may, for example, allow thermal shield 302 to influence the temperature of the environment surrounding sensor 106.

Combining some of the features of detection system 100 and detection system 300 into detection system 400 may allow the difference in temperature between the indicia and the environment surrounding the sensor to increase. The ability of sensor 106 to detect the differential emissivity values of the elements of indicium 102 may also increase as the difference in temperature increases.

Figure 5:
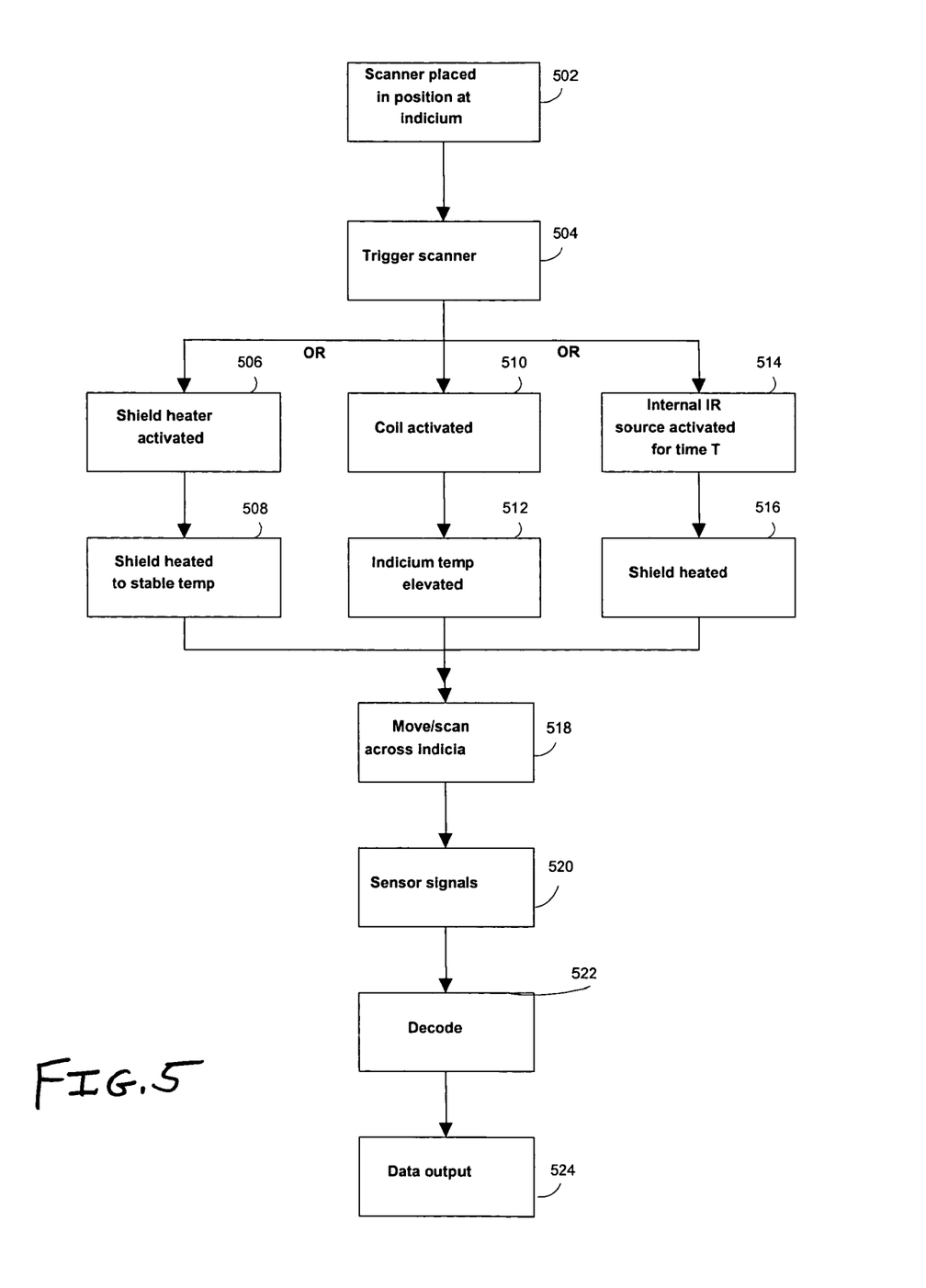
FIG. 5 is a block diagram outlining a preferred embodiment of the detection and decoding process.

FIG. 5 is a block diagram of a detection process that may be used in accordance with the present invention. In step 502, the sensor of a detection system is placed in proximity to the indicium on the substrate that may be measured. In step 504, the detection system may be activated and the control circuitry initiates, monitors and controls the detection system.

In steps 506, 510 and 514 the process flow of three of the embodiments described above are detailed. If the system includes a thermal shield, step 506 may be next and the thermal shield may be activated. After the shield is activated, the shield may assume a stable temperature in step 508. This temperature may serve as or influence the temperature of the environment surrounding sensor 106. If the system includes an electromagnetic energy source, step 510 may be next. In step 510, the electromagnetic energy source is activated and the temperatures of the indicia, substrate, and any intervening layer(s) may be influenced in step 512. If the system includes a thermal energy source, step 514 may be next. In step 514, the thermal energy source may be activated for a period of time or until the proper indicia, layer, and/or substrate temperature may be reached.

In step 518, the detection system may be moved across a substrate where the indicium may be present. In step 520, the sensor generates a data signal representative of the varying emissivity values that were measured. In step 522, the data generated by the sensor representing any information stored by the indicia may be decoded by decoding circuitry 124. In step 524, the data decoded by decoding circuitry 124 may output via a user interface in a format that may be easy to understand.

Persons skilled in the art will appreciate that the detection systems described above in accordance with the principles of the present invention are provided as illustrations of the invention only, and that the invention is not limited by the specific configurations described above. For example, as described above, detection systems 100 and 200 may elevate the temperature of indicium 102, however, the invention is not limited in this manner. Rather, any suitable difference in temperature between the environment local to the sensor and the indicium may be used to measure the varying emissivity values of the indicium and, if applicable, the substrate and intervening layers. Additionally, while certain uses for the detection systems are described above, other uses are also within the scope of the invention. These other uses may include, for example, authenticating driver's licenses and/or hospital identification tags by detecting hidden codes.

Additionally, those skilled in the art may appreciate that certain embodiments either shown or not shown in the figures may be combined to form other detection systems in accordance with the principles of the present invention. For example, the embodiment shown in FIG. 3 may be combined with the embodiment shown in FIG. 2. Combining these embodiments may be beneficial because a greater difference in temperature between the targets and the background may be obtained. For example, electromagnetic energy source 210 may elevate the temperature of the indicium while thermal shield 302 lowers the temperature of the environment surrounding sensor 106. In this manner, the temperature differential may increase similar to the embodiment shown in FIG. 4.

Moreover, it may also be understood by those skilled in the art that the various components of the detection systems according to the present invention may be manufactured together, or individually. They may be assembled as a single item or as multiple items to be linked together. However, as explained above, it is also contemplated that some or all of these components may utilize remote controls and/or displays, and that in certain embodiments, some components may be excluded (or combined with other components).

The invention is not limited in these manners. The above-described embodiments of the present invention are presented for purposes of illustration and not of limitation, and the present invention is limited only by the claims that follow.

What is claimed is:

1. A system for detecting indicium, the indicium comprising a first element having a first emissivity value and a second element having a second emissivity value different from the first emissivity value, the system comprising:
   an electromagnetic energy source that provides energy to affect a relative temperature of the indicium; and
   a sensor that detects differential emissivity values based at least partially on the first emissivity value of the indicium and the second emissivity value of the indicium, wherein:
      the indicium resides on a conductive layer; and
      the electromagnetic energy source affects the relative temperature of the indicium by increasing a temperature of the conductive layer.

2. The system of claim 1, wherein:
   the sensor detects a difference in energy emitted by the first element of the indicium and the second element of the indicium.

3. The system of claim 1, further comprising:
   operating circuitry coupled to the sensor, wherein the operating circuitry decodes information encoded in the indicium.

4. The system of claim 1, wherein a temperature of the indicium is measurably different from a temperature of an environment surrounding the sensor.

5. The system of claim 1, wherein the temperature of the conductive layer affects the relative temperature of the indicium by increasing a temperature of the indicium.

6. The system of claim 1, wherein the temperature of the conductive layer affects the relative temperature of the indicium by increasing a temperature of the indicium so that the temperature is relatively warmer than a temperature of an environment surrounding the sensor.

7. The system of claim 1, wherein the electromagnetic energy source is a solenoid coil.

8. The system of claim 1, wherein the electromagnetic energy source increases the temperature of the conductive layer by inducing an electrical current in the conductive layer.

9. The system of claim 1, wherein the conductive layer is formed from at least one of copper and aluminum.

10. The system of claim 1, wherein the indicium further resides on a substrate having an emissivity value different from at least one of the first emissivity value and the second emissivity value.

11. The system of claim 10, wherein the electromagnetic energy source further affects the relative temperature of the indicium by providing electromagnetic radiation that adequately equalizes a surface temperature of the indicium with a surface temperature of the substrate.

12. A system for detecting indicium, the indicium comprising a first element having a first emissivity value and a second element having a second emissivity value different from the first emissivity value, the system comprising:
   an electromagnetic energy source that provides energy to affect a relative temperature of the indicium; and
   a sensor that detects differential emissivity values based at least partially on the first emissivity value of the indicium and the second emissivity value of the indicium, wherein the electromagnetic energy source is a magnet in motion.

13. A system for detecting indicium, the indicium comprising a first element having a first emissivity value and a second element having a second emissivity value different from the first emissivity value, the system comprising:
   an electromagnetic energy source that provides energy to affect a relative temperature of the indicium; and
   a sensor that detects differential emissivity values based at least partially on the first emissivity value of the indicium and the second emissivity value of the indicium, wherein:
      the indicium comprises high solids content ink; and
      the electromagnetic energy source affects the relative temperature of the indicium by inducing an electrical current in the ink.

14. The system of claim 13, wherein:
   the sensor detects a difference in energy emitted by the first element of the indicium and the second element of the indicium.

15. A system for detecting indicium, the indicium comprising a first element having a first emissivity value and a second element having a second emissivity value different from the first emissivity value, the system comprising:
   an electromagnetic energy source that provides energy to affect a relative temperature of the indicium; and
   a sensor that detects differential emissivity values based at least partially on the first emissivity value of the indicium and the second emissivity value of the indicium, wherein:
      the indicium comprises high solids content ink;
      the electromagnetic energy source affects the relative temperature of the indicium by increasing a temperature of the high solids content ink; and
      the high solids content ink results in a high density of conductors in the indicium.

16. The system of claim 15, further comprising:
operating circuitry coupled to the sensor, wherein the operating circuitry decodes information encoded in the indicium.

17. A method for detecting energy emitted by an indicium, the indicium comprising a first element having a first emissivity value and a second element having a second emissivity value different from the first emissivity value, the method comprising:
providing electromagnetic energy to affect a relative temperature of the indicium; and
detecting a differential emissivity value based at least partially on the first emissivity value of the indicium and the second emissivity value of the indicium, wherein:
the indicium resides on a conductive layer; and
the providing comprises increasing a temperature of the conductive layer.

18. The method of claim 17, wherein the detecting comprises detecting a difference in energy emitted by the first element of the indicium and the second element of the indicium.

19. The method of claim 17, wherein:
the indicium represents coded information; and
the method further comprises decoding the coded information.

20. The method of claim 17, further comprising:
detecting when the relative temperature of the indicium is substantially constant, wherein the detecting the differential emissivity value is performed while the relative temperature of the indicium is substantially constant.

21. The method of claim 17, wherein a temperature of the indicium is measurably different from a temperature of an environment surrounding the sensor.

22. The method of claim 17, wherein the temperature of the conductive layer increases a temperature of the indicium.

23. The method of claim 17, wherein the temperature of the conductive layer increases a temperature of the indicium so that the temperature of the indicium is relatively warmer than a temperature of an environment surrounding the sensor.

24. The method of claim 17, wherein the providing comprises increasing the temperature of the conductive layer by inducing an electrical current in the conductive layer.

25. The method of claim 17, wherein the conductive layer is formed from at least one of copper and aluminum.

26. The method of claim 17, wherein the indicium further resides on a substrate having an emissivity value different from the first emissivity value and the second emissivity value.

27. The method of claim 26, wherein the providing further comprises:
providing electromagnetic radiation that adequately equalizes a surface temperature of the indicium with a surface temperature of the substrate.

28. A method for detecting energy emitted by an indicium, the indicium comprising a first element having a first emissivity value and a second element having a second emissivity value different from the first emissivity value, the method comprising:
providing electromagnetic energy to affect a relative temperature of the indicium; and
detecting a differential emissivity value based at least partially on the first emissivity value of the indicium and the second emissivity value of the indicium, wherein:
the indicium comprises high solids content ink; and
the providing comprises increasing a temperature of the high solids content ink by inducing an electrical current in the ink.

29. The method of claim 28, wherein the detecting comprises detecting a difference in energy emitted by the first element of the indicium and the second element of the indicium.

30. A method for detecting energy emitted by an indicium, the indicium comprising a first element having a first emissivity value and a second element having a second emissivity value different from the first emissivity value, the method comprising:
providing electromagnetic energy to affect a relative temperature of the indicium; and
detecting a differential emissivity value based at least partially on the first emissivity value of the indicium and the second emissivity value of the indicium, wherein:
the indicium comprises high solids content ink;
the providing comprises increasing a temperature of the high solids content ink; and
the high solids content ink results in a high density of conductors in the indicium.

31. The method of claim 30, wherein:
the indicium represents coded information; and
the method further comprises decoding the coded information.

32. A method for detecting energy emitted by an indicium, the indicium comprising at least one emissivity value and residing on a conductive layer, the method comprising:
providing electromagnetic energy to affect a relative temperature of the indicium by increasing a temperature of the conductive layer;
detecting when the relative temperature of the indicium is a substantially constant value; and
in response to detecting that the relative temperature of the indicium is a substantially constant value, detecting a differential emissivity value based at least partially on the at least one emissivity value of the indicium.

33. The method of claim 32, wherein a temperature of the indicium is measurably different from a temperature of an environment surrounding the sensor.

34. The method of claim 32, wherein:
the indicium comprises at least two elements; and
the at least one emissivity value comprises at least two emissivity values that are different and are associated with the at least two elements, respectively.

35. The method of claim 32, wherein the indicium further resides on a substrate having an emissivity value different from the at least one emissivity value.

36. The method of claim 35, wherein the providing further comprises:
providing electromagnetic radiation that adequately equalizes a surface temperature of the indicium with a surface temperature of the substrate.

* * * * *